(12) United States Patent
Liebe

(10) Patent No.: US 11,680,604 B2
(45) Date of Patent: Jun. 20, 2023

(54) ROLLER BEARING SEAL ASSEMBLY

(71) Applicant: Amsted Rail Company, Inc., Chicago, IL (US)

(72) Inventor: Timothy M. Liebe, Midlothian, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 274 days.

(21) Appl. No.: 17/100,259

(22) Filed: Nov. 20, 2020

(65) Prior Publication Data

US 2022/0163066 A1 May 26, 2022

(51) Int. Cl.
*F16C 33/78* (2006.01)
*F16C 33/80* (2006.01)
*F16J 15/3264* (2016.01)

(52) U.S. Cl.
CPC ...... *F16C 33/7813* (2013.01); *F16C 33/7883* (2013.01); *F16C 33/80* (2013.01); *F16C 33/805* (2013.01); *F16J 15/3264* (2013.01); *F16C 2326/10* (2013.01)

(58) Field of Classification Search
CPC .. F16C 33/7813; F16C 33/782; F16C 33/783; F16C 33/7879; F16C 33/7883; F16C 33/7886; F16C 33/80; F16C 33/805; F16C 2326/10; F16J 15/3256; F16J 15/3264; B61F 15/12
See application file for complete search history.

(56) References Cited

U.S. PATENT DOCUMENTS

| | | | |
|---|---|---|---|
| 1,978,739 | A | 10/1934 | Brittain, Jr. |
| 3,494,682 | A | 2/1970 | Keller |
| 4,458,957 | A | 7/1984 | Greener |
| 4,541,744 | A | 9/1985 | Ledeman |
| 4,960,335 | A | 10/1990 | Otto |

(Continued)

FOREIGN PATENT DOCUMENTS

| | | |
|---|---|---|
| CN | 1696548 A | 11/2005 |
| CN | 101418831 A | 4/2009 |

(Continued)

OTHER PUBLICATIONS

PCT Search Report and Written Opinion from International Application No. PCT/US2021/053517 dated Jan. 21, 2022; 18 pages.

*Primary Examiner* — Nicholas L Foster
(74) *Attorney, Agent, or Firm* — Fitch, Even, Tabin & Flannery LLP

(57) ABSTRACT

In accordance with one aspect of the present disclosure, a rotor for a railway roller bearing seal assembly is provided. The rotor includes an annular body rotatable about a central axis and including radially inner and outer rings. The annular body includes an intermediate portion connecting the radially inner and outer rings and spacing the radially inner ring in a first direction from a base portion of the annular body. The annular body further includes a pocket formed at least in part by the intermediate portion and a snap-fit portion axially intermediate the base portion and a free end portion of the radially inner ring. The snap-fit portion of the annular body is configured to form a snap-fit connection with a snap-fit member of a slinger that extends into the pocket.

37 Claims, 13 Drawing Sheets

(56) References Cited

U.S. PATENT DOCUMENTS

| | | | |
|---|---|---|---|
| 5,017,025 A * | 5/1991 | Williams | F16C 33/7813 |
| | | | 384/571 |
| 5,172,984 A | 12/1992 | Lederman | |
| 5,975,533 A | 11/1999 | Hubbard | |
| 6,386,546 B1 | 5/2002 | Fedorovich | |
| 7,534,047 B2 | 5/2009 | Reed | |
| 7,546,807 B2 | 6/2009 | Johnstone | |
| 7,549,379 B2 | 6/2009 | Monaco | |
| 7,607,836 B2 | 10/2009 | Mason | |
| 8,109,674 B2 | 2/2012 | Hubbard | |
| 8,226,299 B2 | 7/2012 | Hubbard | |
| 8,356,941 B2 | 1/2013 | Mason | |
| 8,356,945 B2 | 1/2013 | Mason | |
| 8,360,651 B1 | 1/2013 | Fetty | |
| 8,533,957 B2 | 9/2013 | Spurlock | |
| 8,556,270 B2 | 10/2013 | Toth | |
| 8,596,872 B2 | 12/2013 | Pruden | |
| 8,696,212 B2 | 4/2014 | Hubbard | |
| 8,708,571 B2 | 4/2014 | Kurohara | |
| 8,790,014 B2 | 7/2014 | Shimizu | |
| 9,150,226 B2 | 10/2015 | Rode | |
| 9,285,034 B2 | 3/2016 | Balsells | |
| 9,689,431 B2 | 6/2017 | Walter | |
| 9,982,719 B2 | 5/2018 | Harada | |
| 10,330,156 B2 | 6/2019 | Hubbard | |
| 10,371,210 B2 | 8/2019 | Hargraves | |
| 10,479,139 B2 | 11/2019 | Tada | |
| 10,711,842 B2 | 7/2020 | Liebe | |
| 10,753,478 B2 * | 8/2020 | Tones | F16C 33/726 |
| 11,220,279 B2 * | 1/2022 | Lumpkin | F16C 33/7886 |
| 2003/0141668 A1 | 7/2003 | Tones | |
| 2003/0201609 A1 | 10/2003 | Hood | |
| 2007/0222161 A1 | 9/2007 | Voydatch | |
| 2008/0226212 A1 | 9/2008 | Mason | |
| 2010/0027927 A1 | 2/2010 | Koyagi | |
| 2010/0272381 A1 * | 10/2010 | Hubbard | F16C 33/768 |
| | | | 384/480 |
| 2011/0064347 A1 | 3/2011 | Hubbard | |
| 2011/0216993 A1 | 9/2011 | Mason | |
| 2014/0225333 A1 | 8/2014 | Siegel | |
| 2014/0333031 A1 | 11/2014 | Tones | |
| 2016/0223086 A1 | 8/2016 | Balsells | |
| 2017/0335890 A1 | 11/2017 | Harada | |
| 2018/0128380 A1 * | 5/2018 | Tones | F16J 15/4478 |
| 2018/0355918 A1 * | 12/2018 | Hargraves | F16J 15/4478 |
| 2019/0360532 A1 | 11/2019 | Liebe | |
| 2020/0017129 A1 * | 1/2020 | Lumpkin | F16C 17/246 |
| 2021/0040991 A1 * | 2/2021 | Fetty | B29C 31/00 |
| 2021/0048071 A1 * | 2/2021 | Hargraves | F16J 15/4476 |

FOREIGN PATENT DOCUMENTS

| | | |
|---|---|---|
| CN | 101871487 A | 10/2010 |
| CN | 103016515 A | 4/2013 |
| JP | 2005220940 A | 8/2005 |

\* cited by examiner

ROLLER BEARING SEAL ASSEMBLY

FIELD

This disclosure relates to railway roller bearings and, more specifically, to seal assemblies for railway roller bearings.

BACKGROUND

Railcars have undercarriage truck assemblies that include a frame, one or more wheel assemblies, and roller bearings that connect the wheel assemblies to the frame. Each wheel assembly includes an axle with journals at opposite ends thereof and wheels connected to the axle. Each roller bearing includes a first component mounted to the journal that turns with the journal and a second component that is mounted to the frame.

Various types of roller bearings are used for railcars. One type of roller bearing is a tapered roller bearing that includes one or more rows of tapered rollers. Tapered roller bearings, and other types of bearings, include a lubricant within the bearing to reduce resistance to movement between components of the bearing. Bearings may also include a seal to contain the lubricant within the bearing and to prevent water, dirt, and debris from entering the bearing.

One prior seal for a tapered roller bearing includes a seal case mounted to a bearing cup of the tapered roller bearing. The seal case includes an outer case and an insert press-fit in the seal case. The seal further includes a rotor mounted to a wear ring of a journal and a slinger connected to the rotor. During operation of the tapered roller bearing, the rotor and slinger rotate together relative to the seal case as the journal turns. Further, the assembly of the seal case, rotor, and slinger defines a labyrinth seal that resists egress of lubricant from the tapered roller bearing and the ingress of water and debris into the bearing.

The seal may be separately manufactured from the rest of the tapered roller bearing. In one prior approach, the seal case, rotor, and slinger are assembled at a first facility, transported to a second facility, and then subsequently assembled with a bearing cup and a wear ring of the tapered roller bearing at the second facility. More specifically, the outer case and insert of the seal case are assembled at the first facility by pressing the insert into the outer case. Next, the rotor is press-fit into the insert which fixes the rotor to the insert. The press-fit engagement between the rotor and the insert keeps the rotor assembled with the seal case and insert during transport. An annular inner wall of the slinger is then inserted into an opening of a slightly larger annular wall of the rotor to form a slip-fit connection therebetween. There is some nominal interference between the annular walls of the slinger and the rotor, but the slinger can shift relative to the rotor. The slinger may be made of a more pliable material than the rotor and the loose fit between the slinger and rotor permits the slinger to expand more than the rotor when the rotor/slinger assembly is subsequently press fit onto a wear ring. The assembled seal including the seal case, rotor, and slinger is packaged at the first facility and transported to the second facility.

After the seal has been transported from the first facility to the second facility, an operator at the second facility removes the seal from the package. The operator inserts the seal into a press machine and operates the press machine to press a wear ring into the slinger of the seal which expands the annular wall of the slinger into tight engagement with the annular wall of the rotor and inhibits relative rotary and axial movement between the rotor and slinger. The pressing of the wear ring into the slinger also shifts the rotor axially relative to the insert and disengages the press-fit engagement between the rotor and the insert which disconnects the rotor/slinger assembly from the insert/outer case assembly. Thus, the operation of press-fitting the wear ring into the slinger both secures the wear ring to the rotor/slinger assembly and disengages the rotor/slinger assembly from the insert/outer case assembly. This disconnecting operation permits the rotor/slinger assembly to turn relative to the insert/outer case assembly with turning of the journal. Although the disconnecting operation is necessary in the prior approach to permit the rotor/slinger assembly to turn, the disconnecting operation complicates assembly of the tapered roller bearing at the second facility.

Further, the rotor and the insert are made from an injection-molded plastic and the tolerances between the rotor and the insert may be too loose or too tight which adversely affects assembly and transportation of the seal. For example, if the rotor is too loosely engaged with the insert, the slip-fit connection between the rotor and the insert may permit the rotor and the slinger to fall off of the insert/seal case assembly when the seal is removed from the package at the second facility. If the rotor is too tightly engaged with the insert, the operation of press-fitting the wear ring into the slinger may cause the rotor to rip the insert out of the outer case.

Another issue with the prior seal is that the seals may be stacked for storage or stacked in a container for shipping. However, the stacked seals may fall over and become disorganized. A cardboard tube may be inserted into the aligned central openings of the stacked seals to inhibit tipping over of the stacked seals, but this complicates handling of the seals.

SUMMARY

In accordance with one aspect of the present disclosure, a rotor for a railway roller bearing seal assembly is provided. The rotor includes an annular body rotatable about a central axis, a base portion of the annular body, and a radially outer ring of the annular body extending axially from the base portion in a first direction and including a first free end portion. The annular body includes a radially inner ring extending axially in a first direction and having a second free end portion. The radially inner ring is spaced from the radially outer ring to receive a portion of a seal case therebetween. The annular body includes an intermediate portion connecting the radially inner and outer rings and spacing the radially inner ring in the first direction from the base portion. The annular body further includes a pocket formed at least in part by the intermediate portion and a snap-fit portion axially intermediate the base portion and the second free end portion of the radially inner ring. The snap-fit portion of the annular body is configured to form a snap-fit connection with a snap-fit member of a slinger that extends into the pocket. The snap-fit connection permits the rotor to be readily connected to a slinger about a seal case. Further, the pocket of the annular body receives at least a portion of the snap-fit member of the slinger to permit engagement of the rotor snap fit portion and the slinger snap-fit member in a compact envelope adjacent an associated wear ring.

The present disclosure also provides a slinger for a railway roller bearing seal assembly that includes an annular body rotatable about a central axis. The annular body has a radially inner ring with an opening sized to receive a wear ring and a radially outer ring spaced from the radially inner ring to receive a portion of a rotor between the radially inner and outer rings. The annular body includes an intermediate portion connecting the radially inner and outer rings and at least one radially outwardly extending protrusion of the radially inner ring configured to form a snap-fit engagement with the rotor. The slinger may thereby be connected to a rotor about a seal case via the snap-fit engagement which provides an easy-to-handle seal assembly.

In another aspect, a seal assembly for a railway roller bearing is provided that includes a seal case and a rotor and slinger rotatable relative to the seal case about a central axis. The rotor and slinger include interfering portions limiting axial movement of the rotor and slinger relative to one another in a first axial direction. The rotor and slinger have rings that tightly engage one another upon the rotor and slinger receiving a wear ring so that the rotor and slinger rotate with the wear ring. The rings include a free end portion and at least one stop surface that inhibit axial movement of the rotor and the slinger relative to one another in a second axial direction opposite the first axial direction. The interfering portions, free end portion, and at least one stop surface of the rotor and slinger cooperate to provide a fixed axial relationship between the rotor and slinger that maintains accurate dimensions of the seal assembly during assembly of the seal assembly with a roller bearing and during operation of the roller bearing.

The present application also provides a method of assembling a seal assembly for a railway roller bearing. The method includes positioning a rotor and a slinger on opposite sides of a seal case. The method includes positioning a ring of one of the rotor and the slinger between stop surfaces of the other of the rotor and the slinger. The method further includes engaging a snap-fit connection of the rotor and seal case that locks the ring between the stop surfaces and permits the rotor and slinger to rotate relative to the seal case. The method may thereby permit the rotor and slinger to be readily assembled with the seal case while, at the same time, permitting the rotor and slinger to rotate relative to the seal case once the seal assembly has been installed on a bearing cup of the roller bearing without requiring a pressing operation to disengage the rotor/slinger from the seal case.

DETAILED DESCRIPTION

Figure 1:
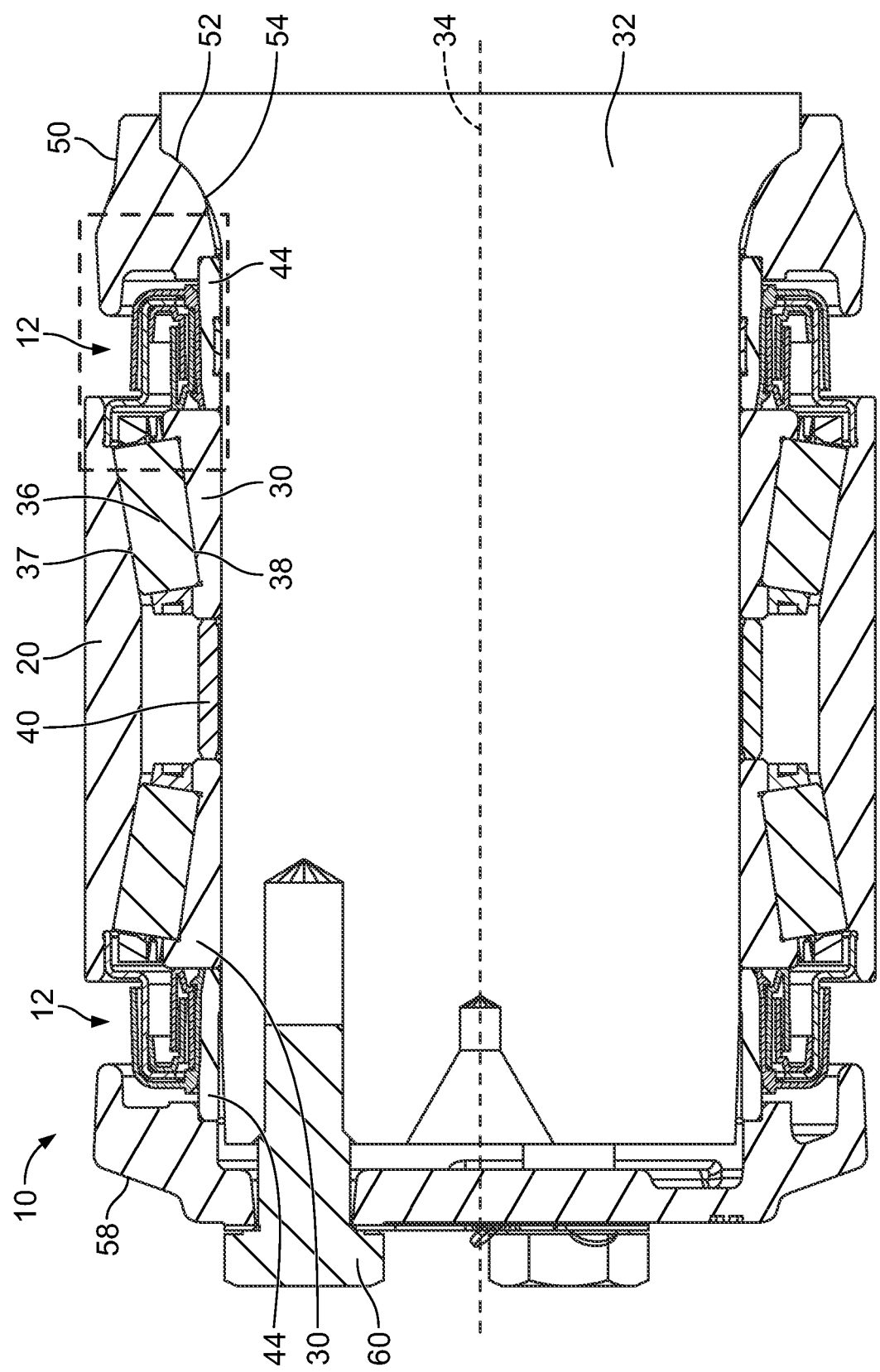
FIG. 1 is a cross-sectional view of a roller bearing including a pair of roller bearing assemblies and associated roller bearing seal assemblies on opposite ends of a cup of the roller bearing.
Figure 2:
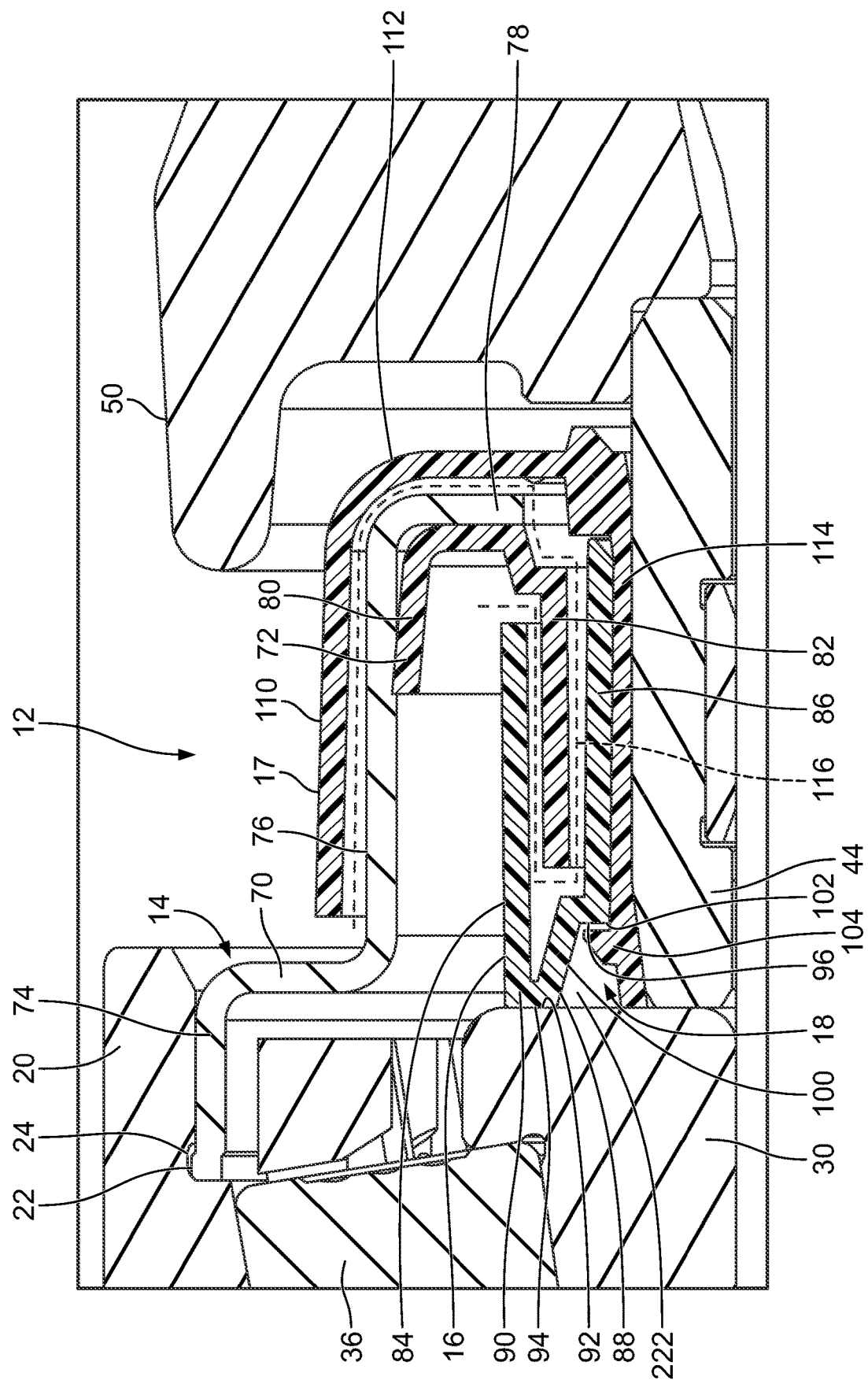
FIG. 2 is an enlarged view of the dashed box area of FIG. 1 showing a snap-fit connection between a rotor and a slinger of one of the bearing seal assemblies of FIG. 1.

With reference to FIGS. 1 and 2, a roller bearing 10 is provided with bearing seal assemblies 12 that each include a seal case 14, a rotor 16, and a slinger 17. The rotor 16 and slinger 17 may be assembled onto the seal case 14 and have a snap-fit connection 18 therebetween that connects the rotor 16 and slinger 17 and rotatably captures the rotor 16 and slinger 17 on the seal case 14 prior to assembly of the roller bearing seal assembly 12 with the other components of the roller bearing 10. This improves handling of the roller bearing seal assembly 12 during transit and assembly with the other components of the roller bearing 10. The snap-fit connection 18 improves handling of the roller bearing seal assemblies 12 because, once the snap-fit connection 18 is formed by advancing the rotor 16 and slinger 17 relative to one another (see FIGS. 10-13), the rotor 16 and slinger 17 are inhibited from falling off the seal case 14. Once the rotor 16 and slinger 17 have been connected to the seal case 14, the assembled seal case 14, rotor 16, and slinger 17 may be readily mounted to a bearing cup 20 and a wear ring 44 of the roller bearing 10 during assembly of the roller bearing 10.

Regarding FIG. 1, the roller bearing 10 includes bearing cones 30 that receive a journal 32 and are rotatable with the journal 32 about a central axis of rotation 34. The roller bearing 10 includes one or more rows of tapered rollers 36 that travel along raceways 37, 38 of the bearing cup 20 and the bearing cones 30. A spacer ring 40 separates the bearing cones 30. Thus, as the journal turns about the axis of rotation 34, the bearing cones 30 and spacer ring 40 turn with the journal 32 and the tapered rollers 36 roll around the raceways 37, 38 of the bearing cup 20 and the bearing cones 30. The roller bearing 10 includes wear rings 44 on opposite sides of the bearing cones 30 and a backing ring 50. The backing ring 50 has a curved surface 52 that engages a fillet 54 of the journal 32. The roller bearing 10 further includes a retaining clamp 58 that is secured via fasteners such as bolts 60 to the journal 32. When the bolts 60 are tightened down, the retaining clamp 58 clamps the wear rings 44, bearing cones 30, and spacer ring 40 together between the retaining clamp 58 and the backing ring 50.

With reference to FIG. 2, the seal case 14 is mounted to the bearing cup by way of a bead 22 engaged with a groove 24 of the bearing cup 20. The seal case 14 may have a unitary, one-piece constructions or may include two or more assembled components. In one embodiment, the seal case 14 includes an outer case 70 and an insert 72 connected to the outer case 70. The outer case 70 includes an outer portion 74, an intermediate portion 76, and an inner portion 78. As used herein, the terms outer and inner generally refer to the relative radial position of the structure relative to the central axis of rotation 34. Further, the term radially extending refers to extending at a right angle or obliquely to the axis of rotation.

Regarding FIG. 2, the insert 72 may be press-fit into the outer case 70. The outer case 70 may be made of a plastic or metallic material and the insert 72 may be made of a plastic material. The insert 72 has an outer portion, such as an outer ring 80, engaged with the intermediate portion 76 of the outer case 70 and an inner portion, such as inner ring 82.

The rotor 16 has an outer portion, such as an outer ring 84, and an inner portion, such as an inner ring 86. The rotor 16 further includes an intermediate portion, such as an intermediate wall 88, connecting the outer and inner rings 84, 86. In one embodiment, the inner wall 88 has a frustoconical shape. The rotor 16 may be made of a plastic or metallic material and may have a unitary, one-piece construction.

Regarding FIG. 2, the inner wall 88 imparts an axial offset to the inner ring 86 relative to the outer ring 84. More specifically, the rotor 16 has a base portion 90 with a surface 92 that seats against a surface 94 of the bearing cone 30 and the intermediate wall 88 extends axially from the surface 92 to position a shoulder 96 of the rotor 16 axially spaced from the surface 92 of the rotor base portion 90. The terms axial and axially extending as used herein are intended to refer to having an extent along the axis of rotation 34 and may refer to a component that is intersected by the axis or spaced from the axis. The shoulder 96 may have a generally radial, projecting shape that transitions from a frustoconical surface 100 of the intermediate wall 88 to a surface 102 of the shoulder 96. In one embodiment, the surface 102 extends normal to the axis of rotation. The shoulder 96 may extend continuously without interruption around the rotor 16 and form an interior rim of the rotor 16.

In one embodiment, the rotor 16 has a snap-fit member, such as the shoulder 96, that engages a corresponding snap-fit member of the slinger 17. For example, the slinger 17 may include a protrusion, such as a barb 104, that is in an axially overlapping relation with the shoulder 96 once the slinger 17 has been connected to the rotor 16 (see FIG. 2). The slinger 17 includes an outer portion, such as an outer ring 110, an intermediate portion, such as an intermediate wall 112, and an inner portion, such as an inner ring 114. The slinger 17, seal case 14, and rotor 16 cooperate to form a tortuous path 116 of the roller bearing seal assembly 12. The tortuous path 116 limits egress of lubricant from the roller bearing 10 and inhibits ingress of dirt and debris from the surrounding environment into the roller bearing 10. The slinger 17 may be made of a plastic or metallic material.

Figure 3:
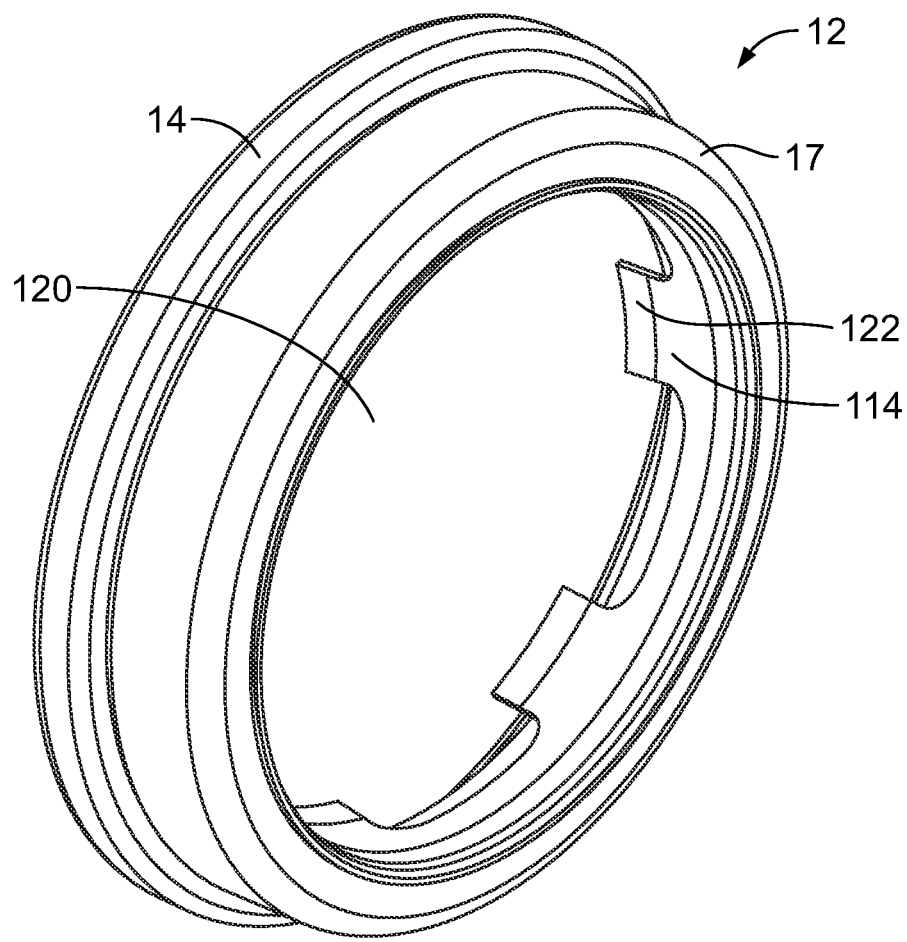
FIG. 3 is a perspective view of the bearing seal assembly of FIG. 2.

Regarding FIG. 3, the seal case 14 has an opening 120 to receive one of the wear rings 44 and the journal 32. The inner ring 114 of the slinger 17 forms a radially innermost section of the roller bearing seal assembly 12 and includes tabs 122 for extending along the wear ring 44. The tabs 122 include the outwardly extending barbs 104 that form the snap-fit connection 18 with the shoulder 96 of the rotor 16. As discussed with reference to FIGS. 10-13, the tabs 122 may be resilient and deflect radially inward to permit the barbs 104 to deflect around the inner ring 86 of the rotor 16 as the rotor 16 and slinger 17 are connected and permit the barbs 104 to snap behind the shoulder 96 once the rotor 16 and slinger 17 have been advanced together.

Figure 4:
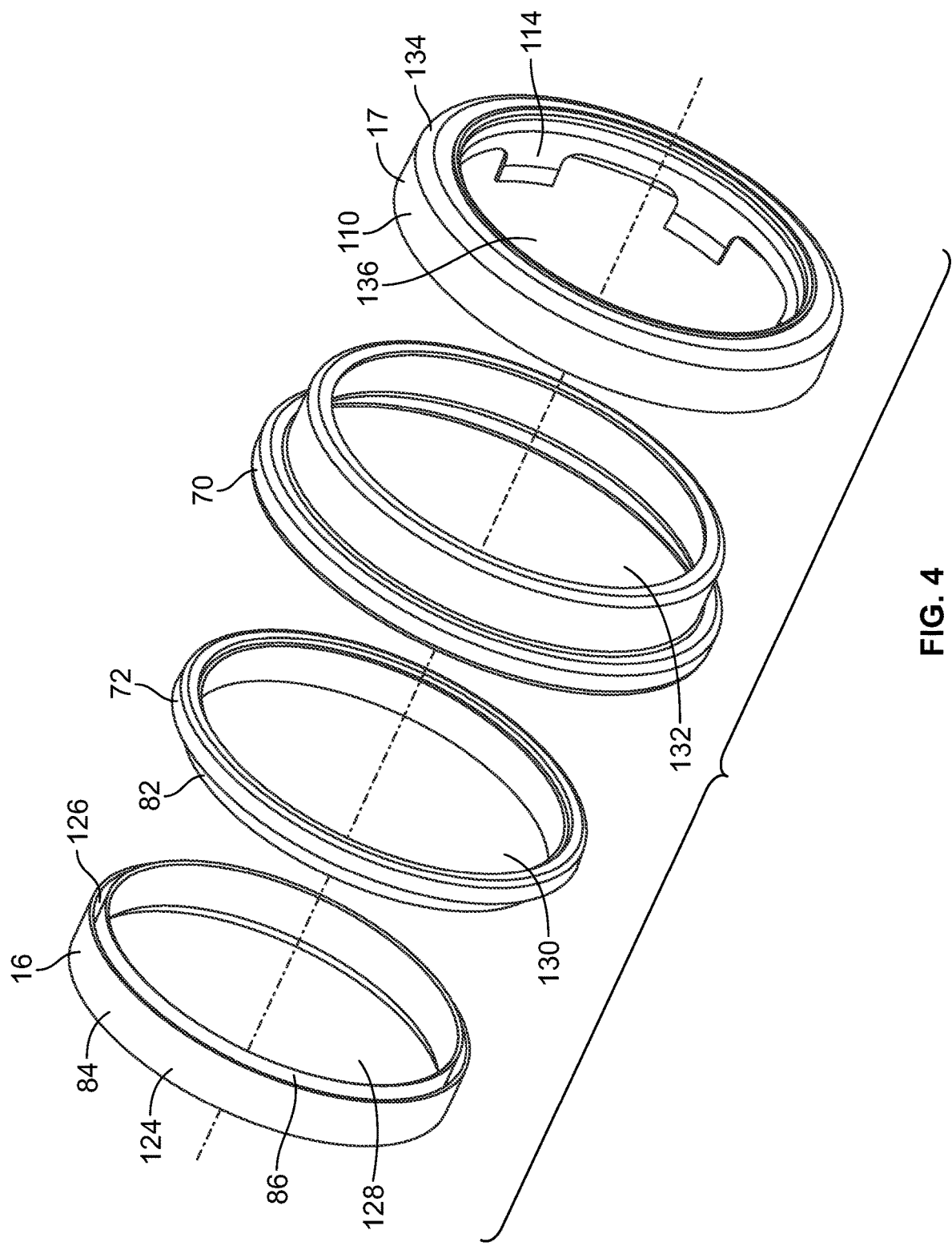
FIG. 4 is an exploded view of the roller bearing seal assembly of FIG. 3 showing the rotor, an insert, an outer case, and the slinger of the roller bearing seal assembly.

Regarding FIG. 4, the rotor 16 has an annular body 124 that includes the outer ring 84, inner ring 86, and a recess 126 therebetween that receives at least a portion of the inner ring 82 of the insert 72. The annular body 124 includes a central opening 128 that receives the inner ring 114 of the slinger 17. The insert 72 includes a central opening 130 that receives the inner ring 86 of the rotor 16 and the inner ring 114 of the slinger 17. The outer case 70 includes a central opening 132 that receives the insert 72. The slinger 17 includes an annular body 134 having a central opening 136 for receiving the wear ring 44.

Figure 5:
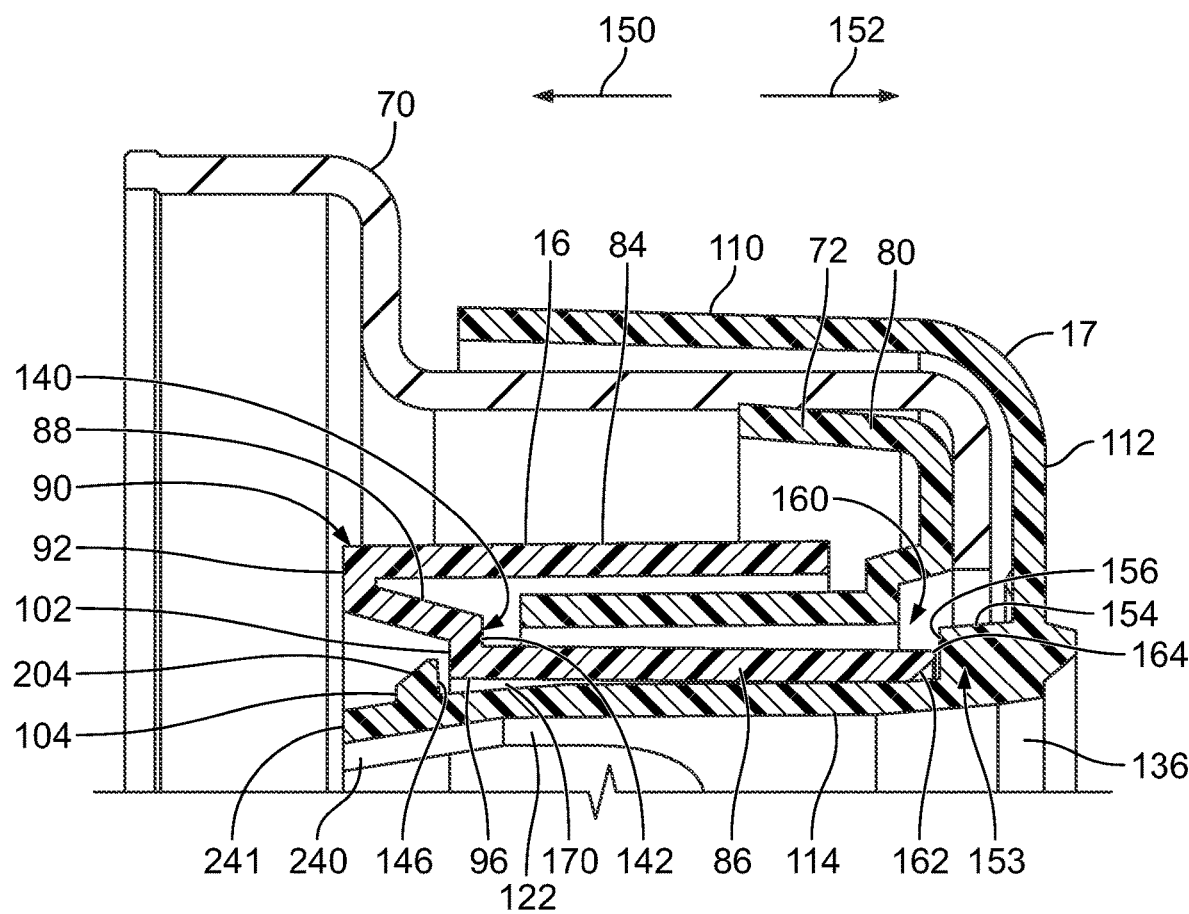
FIG. 5 is a cross-sectional view of seal assembly of FIG. 3 showing an inner ring of the rotor received between a barb and a stop of an inner ring of the slinger.

Regarding FIG. 5, the rotor 16 may have a step profile connecting the outer ring 84 and the inner ring 86. In one embodiment, the rotor 16 includes a juncture 140 connecting the intermediate wall 88 and the inner ring 86. In one embodiment, the juncture 140 includes a substantially right angle between a radial portion 142 and the inner ring 86. The juncture 140 may include the shoulder 96 and the surface 102 thereon that are in axial overlapping relation with a stop surface, such as surface 146, on the underside of the barb 104. Because the surfaces 146, 102 overlap along the axis of rotation 34, the confronting surfaces 146, 102 inhibit axial movement of the rotor 16 in direction 150.

The slinger 17 includes one or more stops 153 that contact a free end portion 160 of the rotor inner ring 86 to inhibit axial movement of the rotor 16 in direction 152. In this manner, the inner ring 86 of the rotor 16 is locked between the barbs 104 and the stops 153 of the slinger 17 once the barbs 104 have snapped behind the shoulder 96 of the rotor 16 as shown in FIG. 5.

More specifically, the stops 153 may include projections, such as walls 154, having one or more stop surfaces 156 thereon. The inner ring 86 of the rotor 16 is received in a recess 166 (see FIG. 9) of the slinger 17 between the barbs 104 and the stop surfaces 156 of the walls 154. Regarding FIG. 5, the free end portion 160 of the rotor inner ring 86 includes an inclined surface 162 that terminates at a point 164. The free end portion 160 may be in abutting contact with the stop surfaces 156 when the rotor 16 connected to the slinger 17. The confronting relation between the free end portion 160 of the rotor inner ring 86 and the stop surfaces 156 of the slinger 17 inhibits movement of the rotor 16 in direction 152 relative to the slinger 17.

In FIG. 5, there is a small radial gap 170 shown between the inner ring 86 of the rotor 16 and the inner ring 114 of the slinger 17. The gap 170 facilitates connecting of the rotor 16 and slinger 17 during assembly of the roller bearing seal assembly 12. However, the wear ring 44 may be pressed into the opening 136 of the slinger 17 during assembly of the roller bearing seal assembly 12 and the wear ring 44. The pressing of the wear ring 44 into the slinger 17 radially expands the inner ring 114 of the slinger 17 into tight engagement with the inner ring 86 of the rotor 16 and closes the radial gap 170.

Figure 9:
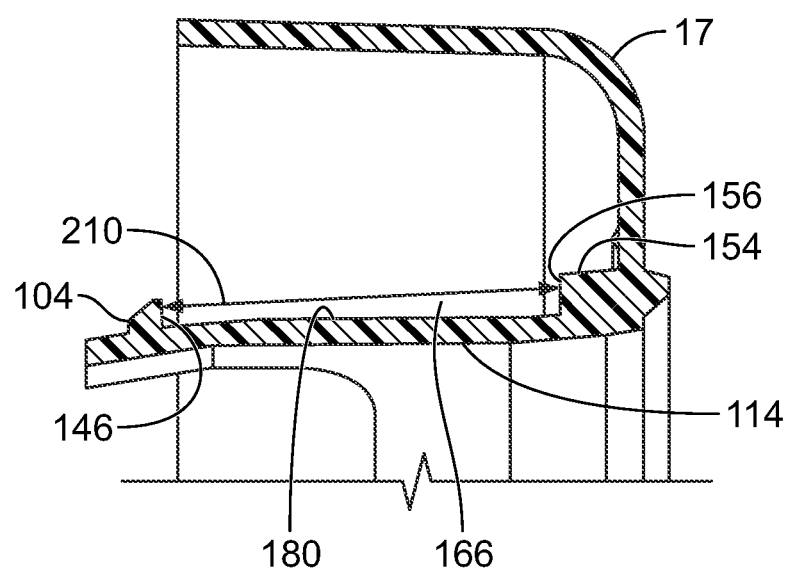
FIG. 9 is a cross-sectional view taken across line 9-9 in FIG. 6 showing a recess formed between a barb and a stop of the slinger.
Figure 10:
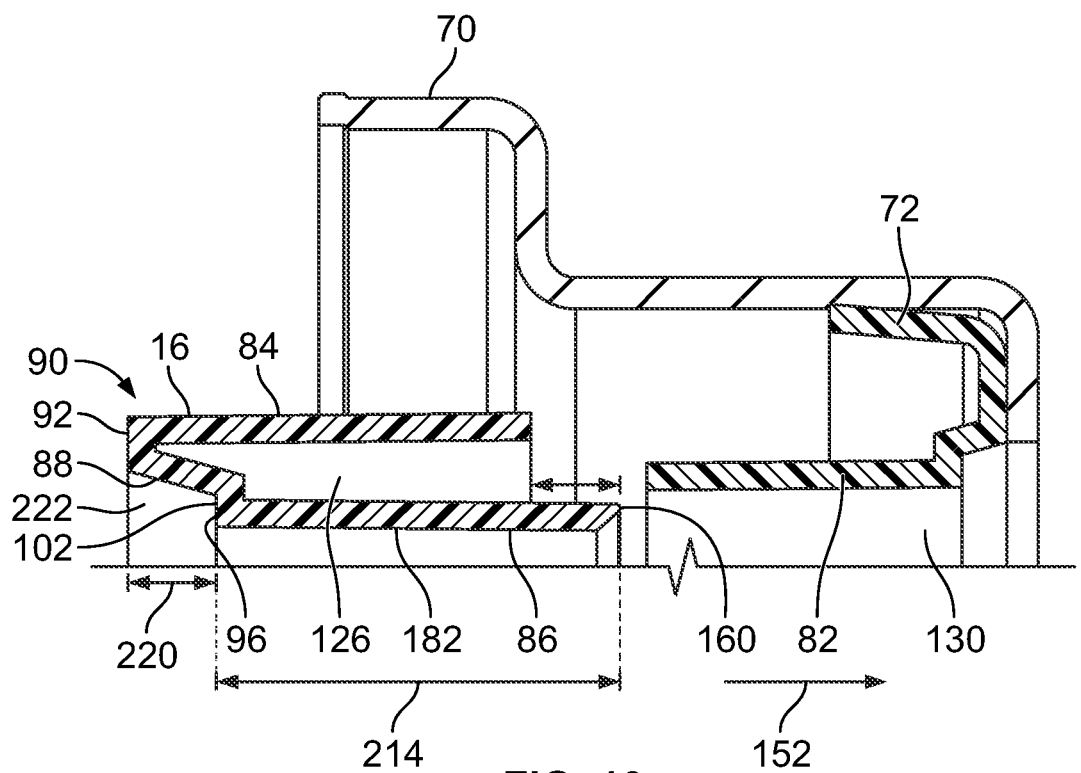
FIGS. 10, 11, 12, and 13 show a method of assembling the seal assembly of FIG. 3.

Regarding FIGS. 9 and 10, the tight engagement caused by pressing the wear ring 44 into the slinger 17 urges a radially outer surface 180 of the slinger inner ring 114 radially outward against a radially inner surface 182 of the rotor inner ring 86. Regarding FIG. 2, with the rotor inner ring 86 tightly frictionally engaged with the slinger inner ring 114, rotation of the wear ring 44 causes rotation of both the slinger 17 and the rotor 16. In this manner, the rotor 16 is fixed in axial directions 150, 152 relative to the slinger 17 by way of the barbs 104 and walls 154 as well as being rotationally fixed to the slinger 17 by way of the engagement between the inner rings 86, 114. The fixed axial positioning of the rotor 16 and slinger 17 accurately positions the rotor 16 relative to the seal case 14 once the slinger 17 and wear ring 44 therein are seated against the bearing cone 30 and provides accurate dimensions of the tortuous path 116.

Figure 6:
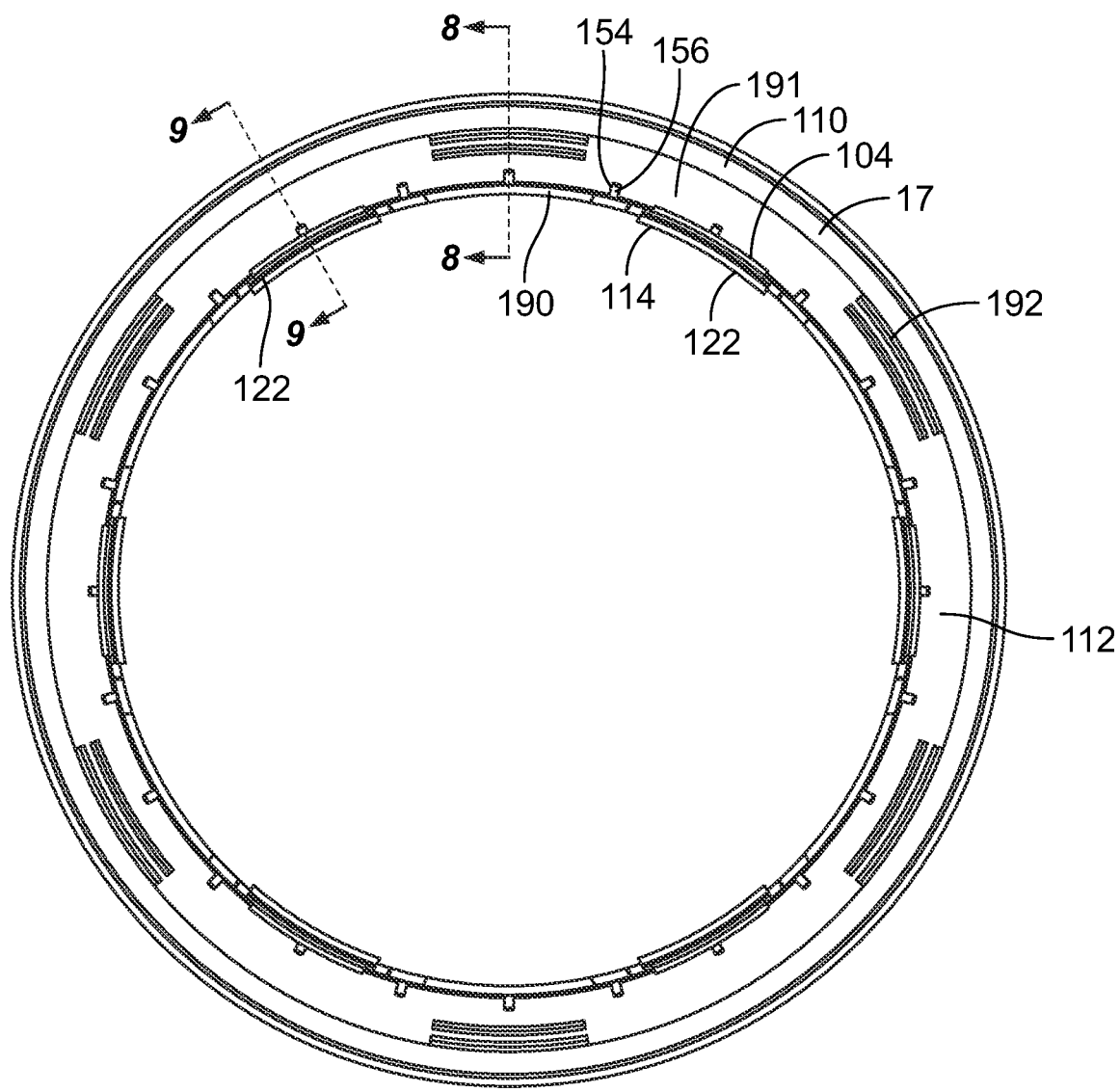
FIG. 6 is a plan view of the slinger of FIG. 2 showing stops of the slinger at angularly spaced locations about the slinger.
Figure 7:
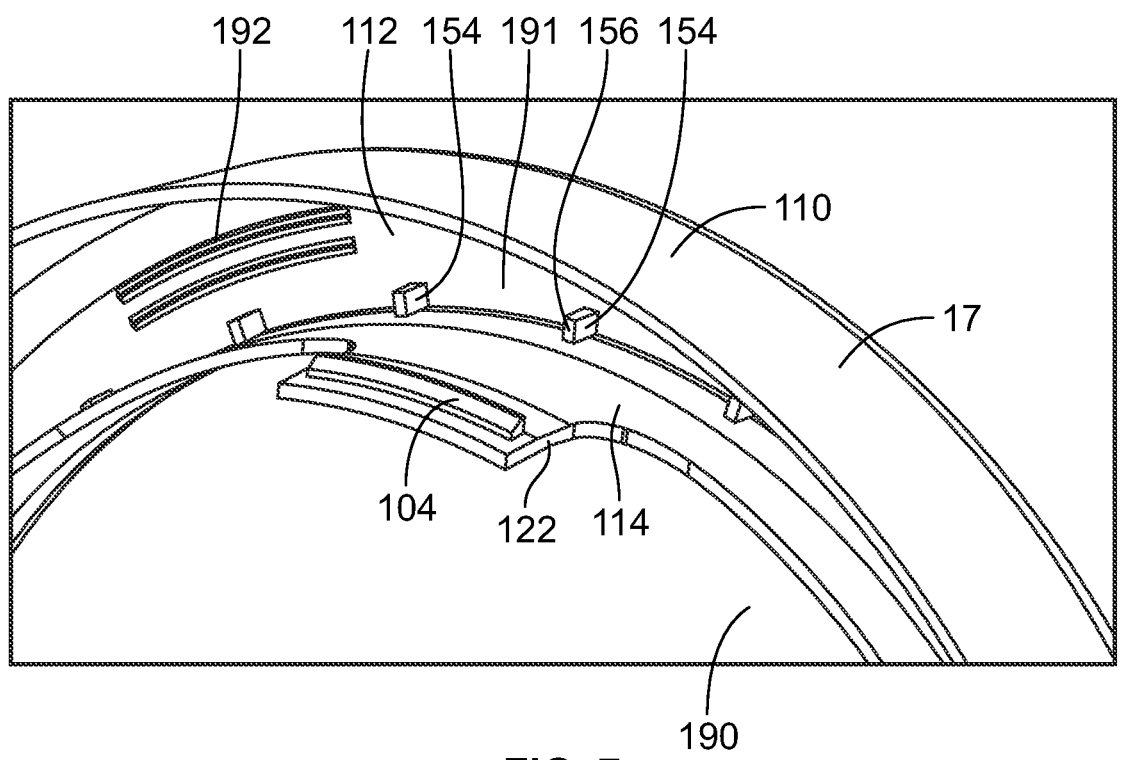
FIG. 7 is a perspective view of the slinger of FIG. 6 showing an outer ring, the inner ring, and a tab of the inner ring including the barb.

Regarding FIGS. 6 and 7, the tabs 122 are angularly spaced apart on the inner wall 114 by angular or circumferential gaps 190 of the inner wall 114. The walls 154 are also angularly spaced apart by circumferential gaps 191 around the intermediate wall 112. The walls 154 provide the stop surfaces 156 while having a relatively uniform material thickness which may facilitate injection molding of the slinger 17. The intermediate wall 112 may have one or more raised portions 192 angularly spaced about the intermediate wall 112. The raised portions 192 may operate as a bumper against the outer case 70 and form line contacts therewith that minimize the frictional resistance between the slinger 17 and the outer case 70. In other embodiments, the intermediate wall 112 does not include raised portions 192.

Figure 8:
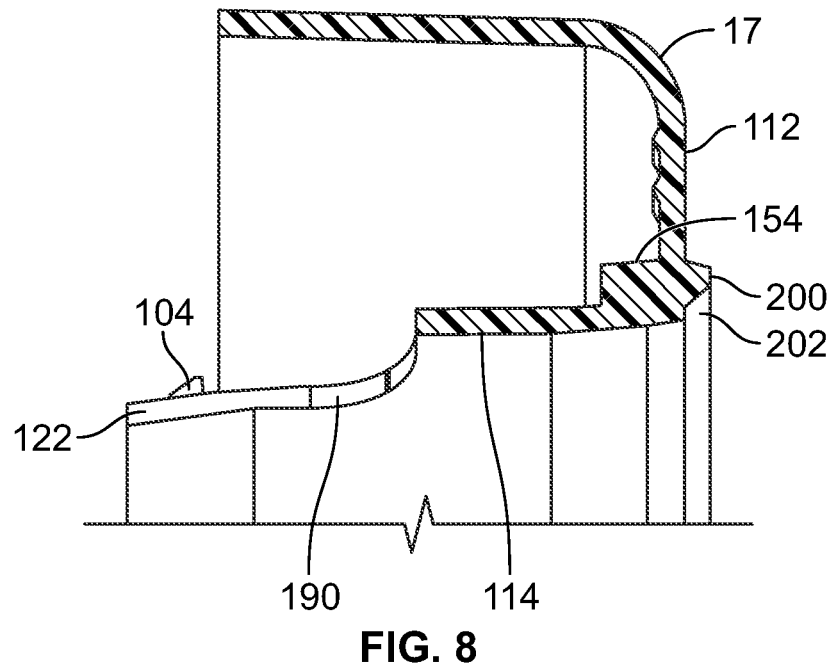
FIG. 8 is a cross-sectional view taken across line 8-8 in FIG. 6 showing a portion of the inner ring wherein there is a circumferential gap between adjacent tabs of the inner ring.
Figure 14:
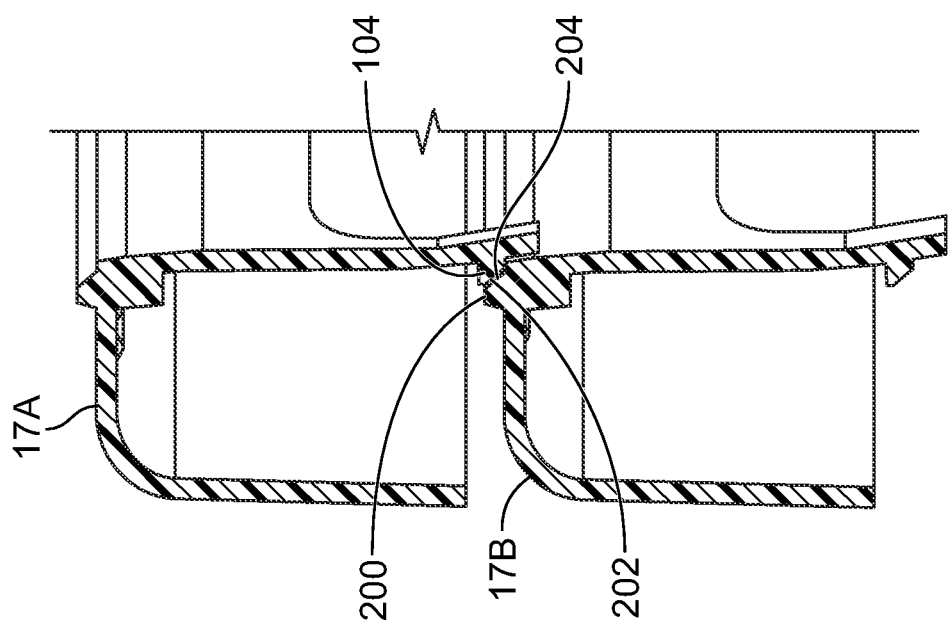
FIG. 14 is a cross-sectional view of a portion of two stacked slingers similar to the slinger of FIG. 5 showing an inclined surface of a barb of the upper slinger seated against an inclined surface of a bead of the lower slinger.

Regarding FIG. 8, the slinger 17 includes a projection, such as a bead 200, on an opposite side of the intermediate wall 112 from the inner ring 114. The bead 200 includes a tapered surface 202 that has a similar taper as an inclined surface 204 (see FIG. 5) of the barbs 104. Regarding FIG. 14, when the slingers 17 are stacked for transport, the barbs 104 of the upper slinger 17A seat against the bead 200 of the lower slinger 17B. The nested surfaces 202, 204 resist relative radial movement of the slingers 17A, 17B and keep the slingers 17A, 17B coaxially aligned and in a stacked configuration. In other embodiments, the bead 200 may be radially outward from the position shown in FIG. 8 and/or may be discontinuous about the slinger 17.

Regarding FIG. 9, the underside surfaces 146 of the barbs 104 are spaced an axial distance 210 from the stop surfaces 156 of the walls 154. The distance 210 is slightly larger than an axial length 214 (see FIG. 10) of the inner ring 86 of the rotor 16. The distance 210 is selected to be slightly larger than the length 214 to permit the inner ring 86 to fit into the recess 166 and to permit the barb 104 to snap behind the shoulder 96 of the rotor 16 as discussed in greater detail below.

Figure 15:
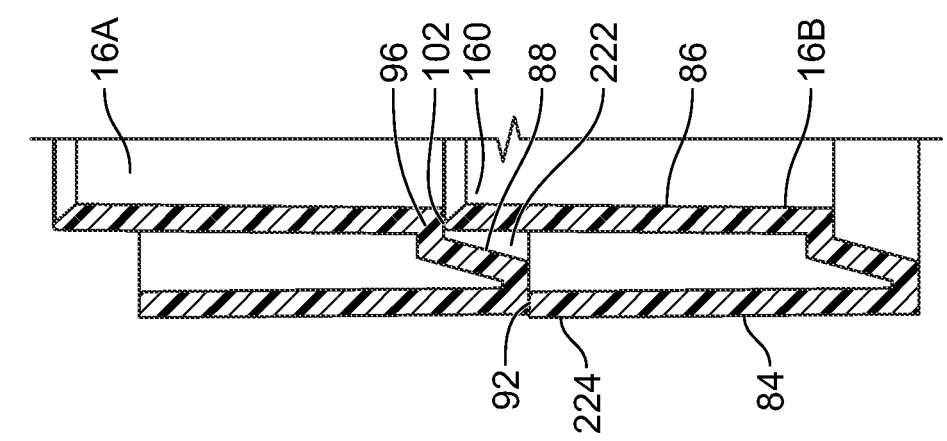
FIG. 15 is a cross-sectional view a portion of two stacked rotors that are similar to the rotor of FIG. 5 showing an inner ring of the lower rotor keeping an intermediate, frustoconical wall of the upper rotor concentric with the inner ring of the lower rotor.

Regarding FIG. 10, the surface 92 of the rotor base portion 90 is spaced an axial distance 220 from the surface 102 of the shoulder 96 by the intermediate wall 88. The axial and radial offsets between the surfaces 92, 102 forms a recess or pocket 222 that receives the barb 104 once the rotor 16 and slinger 17 have been assembled onto the seal case 14 (see FIG. 5). Prior to assembly of the rotor 16 and the slinger 17, and with reference to FIG. 15, the rotors 16A, 16B may be stacked with the pocket 222 of the upper rotor 16A receiving the free end portion 160 of the lower rotor 16B. The free end portion 160 of the lower rotor 16B supports the shoulder surface 102 of the upper rotor 16A. The outer ring 84 of the lower rotor 16B has a free end portion 224 that supports the base portion surface 92 of the upper rotor 16A. Further, the overlap in a radial direction of the inner ring free end portion 160 of the lower rotor 16B and the intermediate wall 88 of the upper rotor 16A inhibits radial relative movement of the rotors 16A, 16B and keeps the rotors 16A, 16B coaxially aligned in a stacked configuration.

Figure 11:
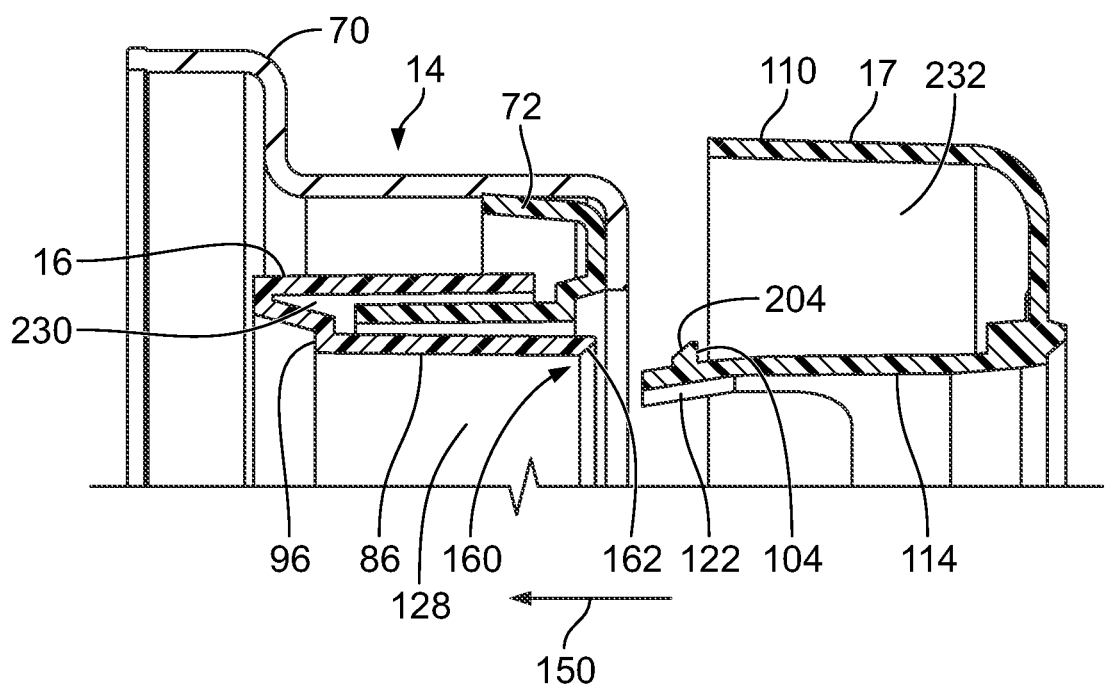

Regarding FIGS. 10-13, a method of assembling the roller bearing seal assembly 12 will be provided. Regarding FIG. 10, the insert 72 has been assembled with outer case 70 and the rotor 16 is positioned so that the inner ring 86 of the rotor 16 is aligned with the opening 130 of the insert 72. The rotor 16 may be advanced in direction 152 to position the inner ring 82 of the insert 72 in the recess 126 between the outer ring 84 and the inner ring 86 of the rotor 16, as shown in FIG. 11.

Regarding FIG. 11, the slinger 17 is positioned so that the inner ring 114 is aligned with the opening 128 of the rotor 16. The slinger 17 has a recess 232 between the outer ring 110 and the inner ring 114 to receive portions of the seal case 14 and rotor 16. The inclined surfaces 204 of the barbs 104 are aligned with the inclined surface 162 of the free end portion 160 of the rotor inner ring 86 and the slinger 17 is advanced in direction 150 relative to the rotor 16. It will be appreciated that the movement of the slinger 17 in direction 150 relative to the rotor 16 may be accomplished by moving the slinger 17 while the rotor 16 remains stationary, moving the rotor 16 while the slinger 17 remains stationary, or moving both the rotor 16 and slinger 17.

Figure 12:
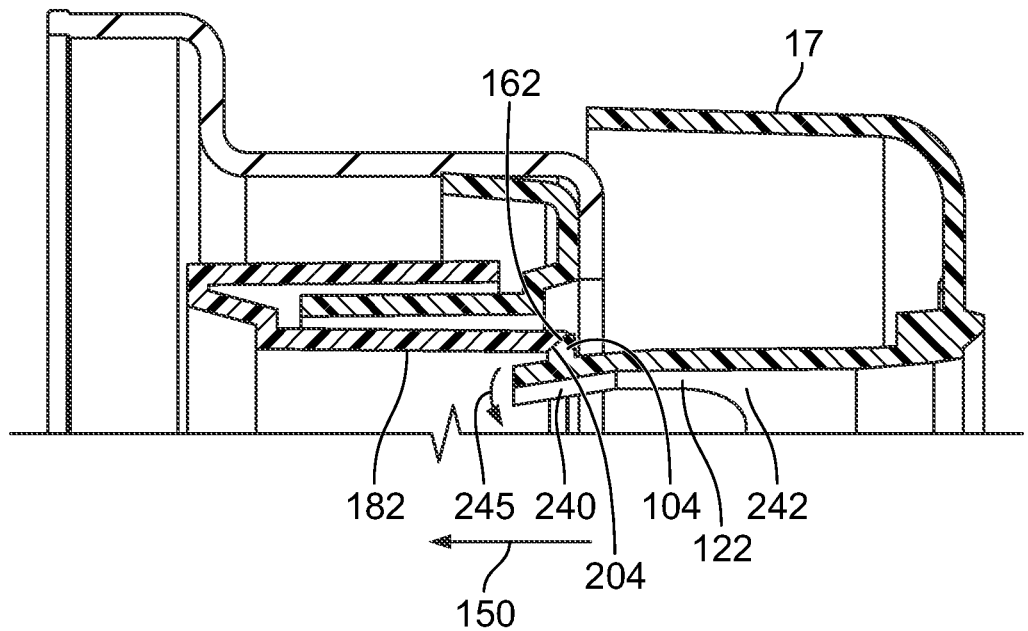

Regarding FIG. 12, the surfaces 162, 204 cammingly engage with advancing of the slinger 17 in direction 150 and deflect the barb 104 radially inward. In one embodiment, the tabs 122 each include a free end portion 240 and a base portion 242. The camming engagement between the surfaces 162, 204 deflects the free end portions 240 of the tabs 122 radially inward and bends the base portion 242 of the tabs 122 to permit the barbs 104 to shift radially inward. Regarding FIG. 5, the free end portion 240 of the tab 122 has a surface 241 that abuts against the bearing cone surface 94 when the slinger 17 and wear ring 44 are seated against the bearing cone 30.

Figure 13:
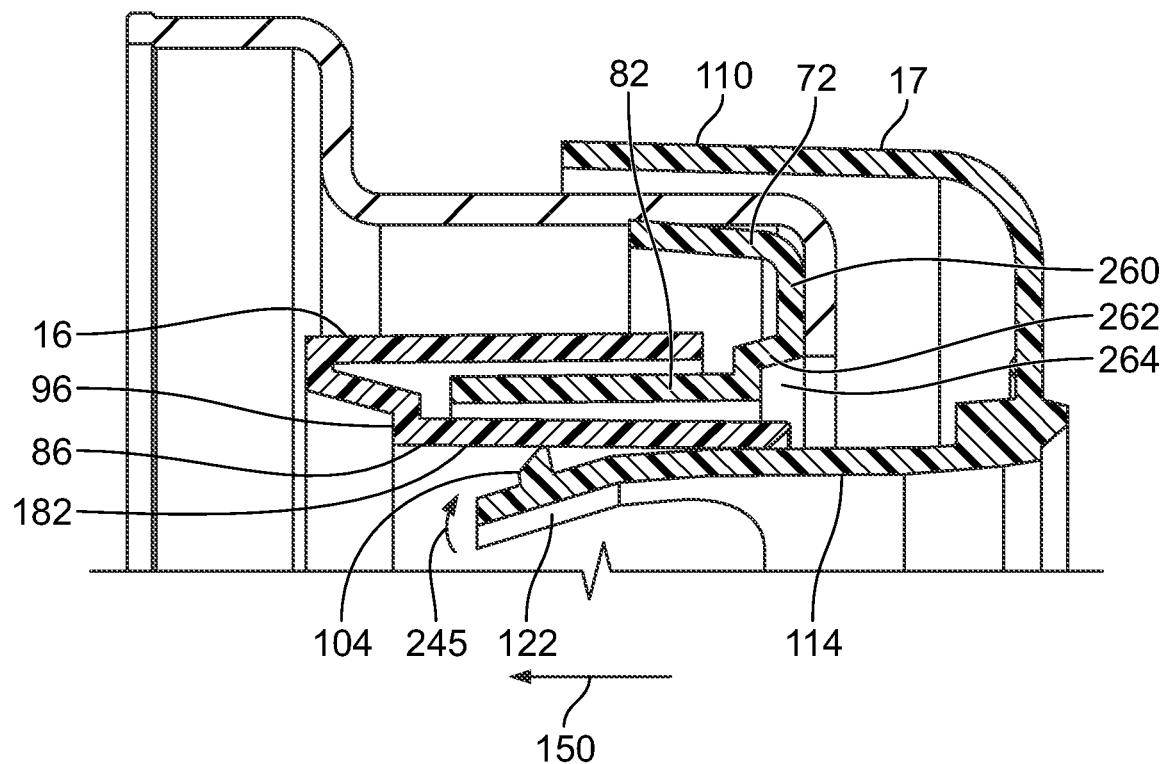

Regarding FIG. 13, the barbs 104 have been shifted inwardly and are advancing along the radial inner surface 182 of the rotor inner ring 86 as the slinger 17 is continued to be advanced in direction 150. The slinger 17 is advanced in direction 150 until the barb 40 is advanced past the shoulder 96. Once the barb 104 has been advanced axially beyond the shoulder 96 of the rotor 16, the tabs 122 may resiliently rebound and shift generally outward in direction 245. The resilient unloading of the tabs 122 positions the barbs 104 in axially overlapping relation with the shoulder 96 of the rotor 16 as shown in FIG. 5.

In one embodiment, the shoulder 96 is continuous around the rotor 16. The barbs 104 may form the snap-fit connection 18 with the shoulder 96 at any rotary position of the slinger 17 relative to the rotor 16. In other words, the slinger 17 may not have to be rotationally positioned in a specific orientation relative to the rotor 16 before advancing the slinger 17 in direction 150 to connect the slinger 17 with the rotor 16. This may make assembly of the rotor 16 and the slinger 17 easier by permitting connection of the rotor 16 and slinger 17 at any rotary position of the two parts as the parts are shifted axially together.

Regarding FIG. 13, the insert 72 has an intermediate wall 260, a connecting wall such as frustoconical wall portion 262, and the inner ring 82. The frustoconical wall portion 262 creates a radial and axial offset between the intermediate wall portion and the ring 82. The offset forms a pocket 264 that provides clearance for the walls 154 of the slinger 17 to rotate relative to the insert 72.

Figure 16:
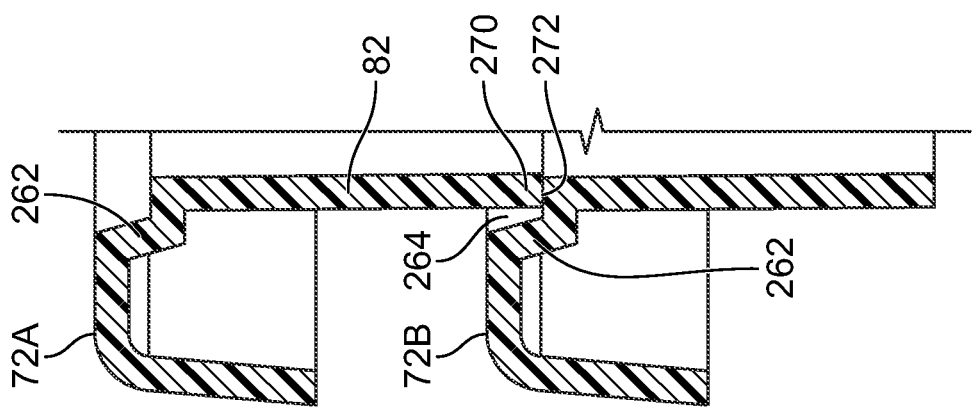
FIG. 16 is a cross-sectional view of a portion of two stacked inserts that are similar to the insert of FIG. 5 showing an inner ring of the upper insert received in a pocket of the lower insert.

Regarding FIG. 16, the inserts 72A, 72B are shown in a stacked configuration. The inner ring 82 of the insert 72A has a free end portion 270 that is received in the pocket 264 of the insert 72B and is supported by a surface 272 of the insert 72B. The free end portion 270 of the insert 72A is near the frustoconical wall portion 262 of the insert 72B such that contact between the free end portion 270 and frustoconical wall portion 262 inhibits radial shifting of the inserts 72A, 72B and keeps the inserts 72A, 72B coaxially aligned in the stacked configuration.

Figure 17:
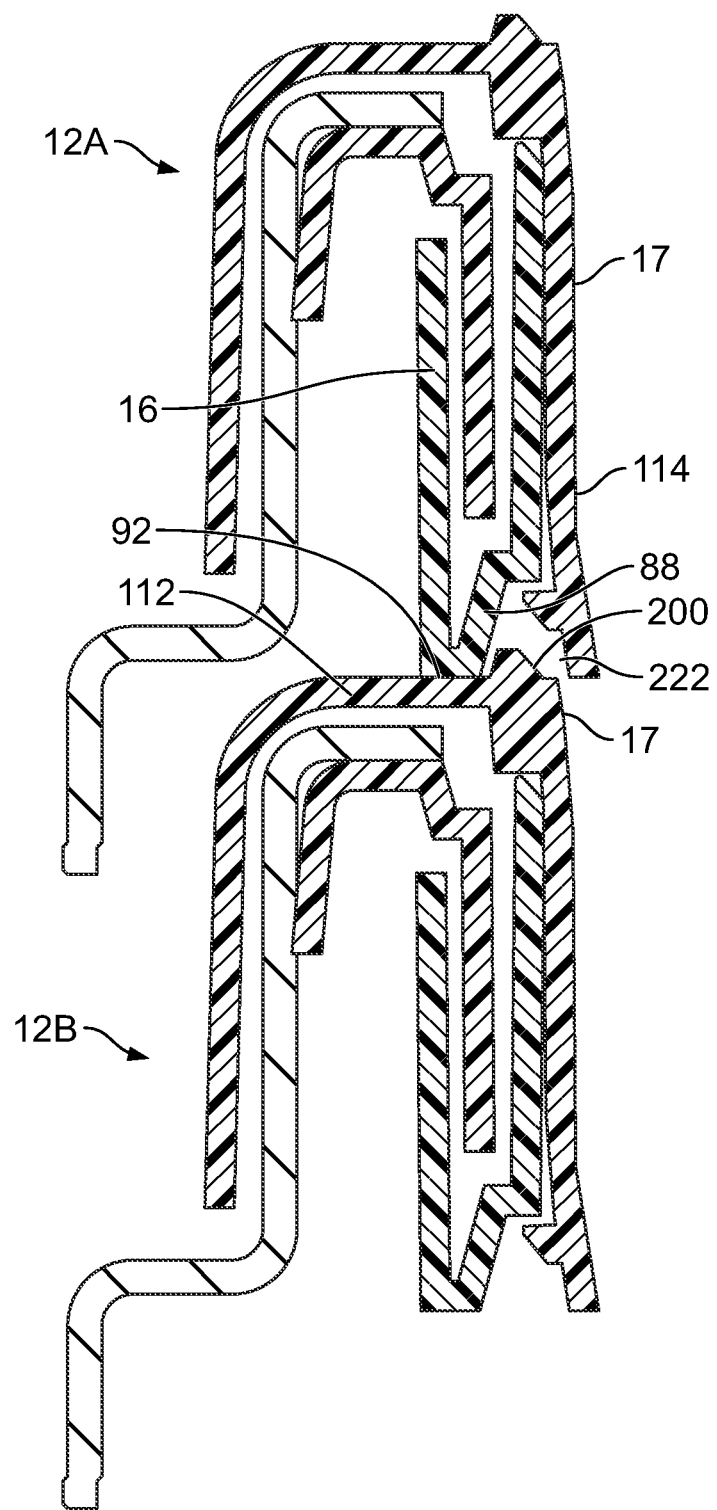
FIG. 17 is a cross-sectional view of a portion of two seal assemblies similar to the seal assembly of FIG. 5 showing the bead of the lower seal assembly received in a pocket of the upper seal assembly which keeps the seal assemblies substantially coaxially aligned.

Regarding FIG. 17, once the roller bearing seal assembly 12 has been assembled, the roller bearing seal assembly 12 has features that permit the roller bearing seal assembly 12 to be stacked with other roller bearing seal assemblies 12. For example and with reference to FIG. 17, the roller bearing seal assembly 12A is stacked on the roller bearing seal assembly 12B. The base portion surface 92 of the rotor 16 of the roller bearing seal assembly 12A is supported on the intermediate wall 112 of the slinger 17 of the roller bearing seal assembly 12B. Further, the bead 200 of the roller bearing seal assembly 12B extends into the pocket 222 of the roller bearing seal assembly 12A. The bead 200 overlaps in the radial directions with the intermediate wall 88 of the rotor 16 and the inner ring 114 of the slinger 17 of the roller bearing seal assembly 12A. The radially overlapping relation between the intermediate wall 88, the bead 200, and the inner ring 114 inhibits radial shifting of the roller bearing seal assemblies 12A, 12B and keeps the roller bearing seal assemblies 12A, 12B coaxially aligned and in the stacked configuration.

Figure 18:
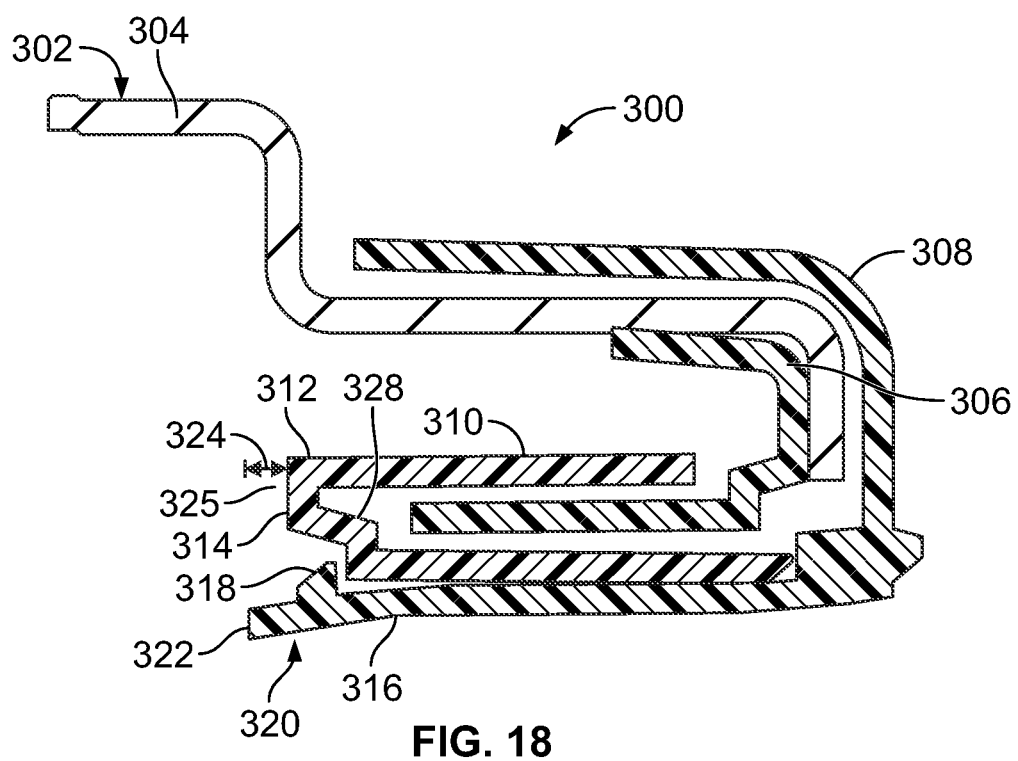
FIG. 18 is a cross-sectional view of another roller bearing seal assembly including a seal case, a rotor, and a slinger wherein the rotor has a base portion that is axially spaced from an inboard end of an inner ring of the slinger.

Regarding FIG. 18, another roller bearing seal assembly 300 is provided that is similar in many respects to the roller bearing seal assembly 12 discussed above such that differences will be highlighted. The roller bearing seal assembly 300 includes a seal case 302 including an outer case 304 and an insert 306. The roller bearing seal assembly 300 further includes a slinger 308 and a rotor 310. The rotor 310 includes a base portion 312 having a surface 314. The slinger 308 includes an inner ring 316 having one or more barbs 318, one or more free end portions 320, and one or more surfaces 322 of the free end portions 320 that seat against a bearing cone. The surfaces 322 are axially spaced a distance 324 from the surface 314. The axial spacing creates an axial gap 325 between the surface 314 of the rotor 310 and the bearing cone, which may be desirable in some circumstances. The rotor 310 may include an intermediate wall 328 that has a shorter axial extent than the intermediate wall 88 discussed above due to the axial offset between the surfaces 314, 322.

Figure 19:
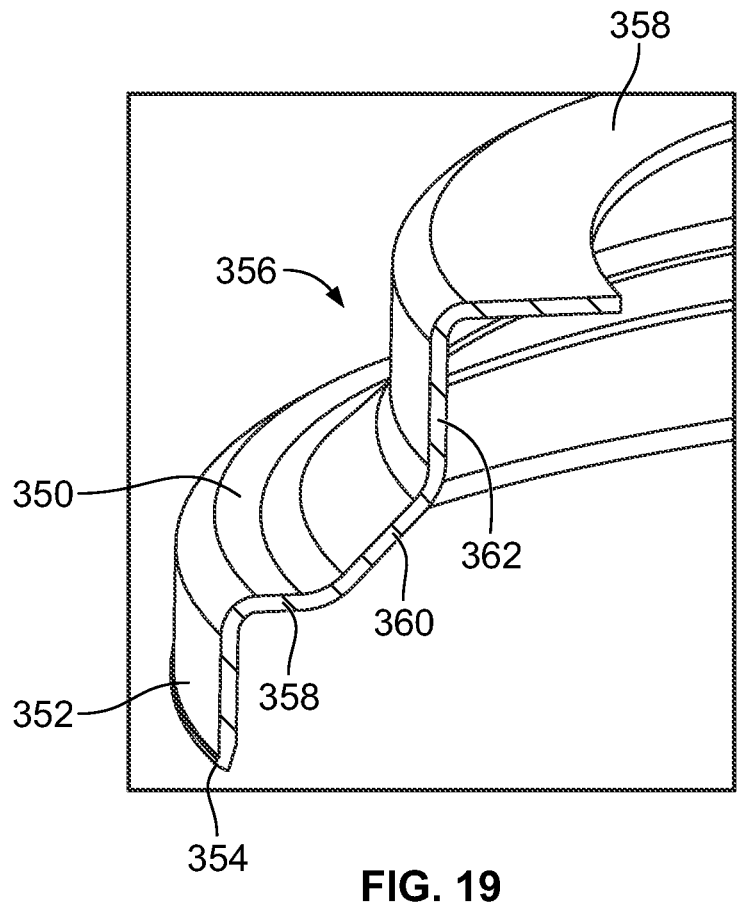
FIG. 19 is a perspective, cross-sectional view of another outer case showing an intermediate portion including a radial wall portion, a frustoconical wall portion, and an axial wall portion.

Regarding FIG. 19, an outer case 350 is provided that is similar in many respects to the outer cases 70, 304 discussed above such that differences will be highlighted. The outer case 350 includes outer portion 352 having a bead 354, an intermediate portion 356, and an inner portion 358. The intermediate portion 356 includes a radial wall portion 358, a frustoconical wall portion 360, and an axial wall portion 362.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. The seals discussed herein may be utilized in various railway applications, such as for bearings of locomotives, rail cars, and rail service vehicles.

What is claimed is:

1. A rotor for a railway roller bearing seal assembly, the rotor comprising:
    an annular body rotatable about a central axis;
    a frustoconical wall of the annular body extending transverse to the central axis, the frustoconical wall having a first radially inner surface;
    a radially outer ring of the annular body;
    a radially outer juncture between the frustoconical wall and the radially outer ring;
    the radially outer ring extending axially from the radially outer juncture in a first direction and including a first free end portion;
    a radially inner ring of the annular body;
    a radially inner juncture between the frustoconical wall and the radially inner ring, the radially inner juncture spaced radially inward and axially in the first direction from the radially outer juncture;
    the radially inner ring extending axially in the first direction from the radially inner juncture and including a second free end portion, the radially inner ring spaced from the radially outer ring to receive a portion of a seal case therebetween, the radially inner ring having a second radially inner surface;
    a pocket of the annular body formed at least in part by the frustoconical wall and the radially inner juncture; and
    a stop surface of the radially inner juncture extending perpendicular to the central axis from the second radially inner surface of the radially inner ring to the first radially inner surface of the frustoconical wall, the stop surface configured to form a snap-fit connection with a snap-fit member of a slinger that extends into the pocket.

2. The rotor of claim 1 wherein the stop surface is annular.

3. The rotor of claim 1 wherein the radially outer juncture of the annular body includes a first surface configured to be positioned adjacent a cone of a bearing assembly;
    wherein the first surface and the stop surface are axially separated by a first distance; and
    wherein the first and second free end portions of the radially inner and outer rings are axially separated by a second distance substantially equal to or greater than the first distance.

4. The rotor of claim 1 wherein the second free end of the radially inner ring is axially beyond the first free end of the radially outer ring in the first direction.

5. The rotor of claim 1 wherein the second free end of the radially inner ring includes a tapered surface extending transverse to the central axis.

6. The rotor of claim 1 wherein the annular body has a unitary, one-piece construction.

7. A slinger for a railway roller bearing seal assembly, the slinger comprising:
    an annular body rotatable about a central axis;

a radially inner ring of the annular body having an opening sized to receive a wear ring;

a radially outer ring of the annular body spaced from the radially inner ring to receive a portion of a rotor between the radially inner and outer rings;

an intermediate portion of the annular body connecting the radially inner and outer rings;

at least one radially outwardly extending protrusion of the radially inner ring configured to form a snap-fit engagement with the rotor;

wherein the inner ring includes a plurality of substantially axially extending tabs; and wherein the at least one protrusion includes a plurality of protrusions extending radially outward from the tabs.

8. The slinger of claim 7 wherein the protrusions include barbs.

9. The slinger of claim 7 wherein the annular body includes at least one stop surface spaced axially from the protrusions along the radially inner ring to receive a portion of the rotor therebetween.

10. The slinger of claim 9 wherein the at least one stop surface is intermediate the intermediate portion and the protrusions in a first axial direction.

11. The slinger of claim 7 wherein the protrusions include barbs of the radially inner ring; and wherein the body includes a plurality of stop surfaces spaced axially from the barbs to receive a portion of a rotor between the barbs and the stop surfaces.

12. The slinger of claim 7 wherein the protrusions include barbs spaced apart about the radially inner ring of the annular body.

13. The slinger of claim 7 wherein the radially inner ring includes a tapered collar portion; and wherein the tapered collar portion includes the protrusions.

14. The slinger of claim 7 further comprising a bead of the body on an opposite side of the intermediate portion from the inner ring, the bead configured to limit radial movement of another slinger stacked on the intermediate portion.

15. A slinger for a railway roller bearing seal assembly, the slinger comprising:

an annular body rotatable about a central axis;

a radially inner ring of the annular body having an opening sized to receive a wear ring;

a radially outer ring of the annular body spaced from the radially inner ring to receive a portion of a rotor between the radially inner and outer rings;

an intermediate portion of the annular body connecting the radially inner and outer rings;

at least one radially outwardly extending protrusion of the radially inner ring configured to form a snap-fit engagement with the rotor; and wherein the protrusion includes an inclined leading surface extending transverse to the central axis and a stop surface extending obliquely to the inclined leading surface.

16. The slinger of claim 15 wherein the at least one protrusion includes at least one barb.

17. The slinger of claim 15 wherein the at least one protrusion comprises a plurality of protrusions.

18. The slinger of claim 17 wherein the inner ring includes a plurality of substantially axially extending tabs; and wherein the tabs include the protrusions.

19. The slinger of claim 15 wherein the annular body includes at least one stop surface spaced axially from the at least one protrusion along the radially inner ring to receive a portion of the rotor between the at least one stop surface and the at least one protrusion.

20. The slinger of claim 19 wherein the stop surface spaced axially from the at least one protrusion is intermediate the intermediate portion and the at least one protrusion in a first axial direction.

21. The slinger of claim 15 wherein the at least one protrusion includes a plurality of barbs of the radially inner ring; and wherein the body includes a plurality of stop surfaces spaced axially from the barbs to receive a portion of a rotor between the barbs and the stop surfaces.

22. The slinger of claim 15 wherein the at least one protrusion includes a plurality of barbs spaced apart about the radially inner ring of the annular body.

23. The slinger of claim 15 wherein the radially inner ring includes a tapered collar portion; and wherein the tapered collar portion includes the at least one protrusion.

24. A slinger for a railway roller bearing seal assembly, the slinger comprising:

an annular body rotatable about a central axis;

a radially inner ring of the annular body having an opening sized to receive a wear ring;

a radially outer ring of the annular body spaced from the radially inner ring to receive a portion of a rotor between the radially inner and outer rings;

an intermediate portion of the annular body connecting the radially inner and outer rings;

at least one radially outwardly extending protrusion of the radially inner ring configured to form a snap-fit engagement with the rotor;

wherein the annular body includes at least one stop surface spaced axially from the at least one protrusion along the radially inner ring to receive a portion of the rotor therebetween; and wherein the at least one stop surface includes a plurality of stop surfaces and the body includes a plurality of projections that include the stop surfaces, the projections angularly spaced about the intermediate portion.

25. A seal assembly for a railway roller bearing, the seal assembly comprising:

a seal case;

a rotor and a slinger rotatable relative to the seal case about a central axis;

interfering portions of the rotor and the slinger limiting axial movement of the rotor and slinger relative to one another in a first axial direction;

rings of the rotor and the slinger that tightly engage one another upon the rotor and slinger receiving a wear ring so that that the rotor and slinger rotate with the wear ring;

a free end portion of the ring of the rotor and at least one stop surface of the ring of the slinger inhibiting axial movement of the rotor and the slinger relative to one another in a second axial direction opposite the first axial direction;

wherein the ring of the slinger includes a plurality of tabs and the interfering portions include protrusions of the tabs.

26. The seal assembly of claim 25 wherein the ring of the rotor is received between the protrusions and the at least one stop surface.

27. The seal assembly of claim 26 wherein the interfering portions include a shoulder associated with the ring of the rotor.

28. The seal assembly of claim 25 wherein the ring of the slinger includes a radial surface of the interfering portions spaced from the at least one stop surface an axial distance sized to permit the ring of the rotor to tightly fit between the radial surface and the at least one stop surface.

29. The seal assembly of claim 25 wherein the at least one stop surface includes a plurality of stop surfaces angularly spaced about the ring of the slinger.

30. The seal assembly of claim 25 wherein the ring of the rotor is an inner ring;
wherein the rotor includes an outer ring and an intermediate portion connecting the outer ring and the inner ring that extends obliquely to the outer ring and the inner ring; and
wherein the interfering portions include a juncture between the intermediate portion and the inner ring.

31. The seal assembly of claim 25 wherein the interfering portions include at least one snap-fit connection between the rotor and the slinger.

32. A method of assembling a seal assembly for a railway roller bearing, the method comprising:
positioning a rotor and a slinger on opposite sides of a seal case;
positioning a ring of the rotor between stop surfaces of the slinger;
engaging a snap-fit connection of the rotor and the slinger that locks the ring between the stop surfaces and permits the rotor and slinger to rotate relative to the seal case; and
wherein positioning the ring of the rotor between the stop surfaces of the slinger includes contacting a free end of the ring of the rotor against one of the stop surfaces of the slinger.

33. The method of claim 32 wherein engaging the snap-fit connection includes engaging at least one protrusion with a shoulder.

34. The method of claim 33 wherein the at least one protrusion includes at least one of the stop surfaces.

35. The method of claim 32 wherein engaging the snap-fit connection includes engaging a plurality of barbs with a rim.

36. A method of assembling a seal assembly for a railway roller bearing, the method comprising:
positioning a rotor and a slinger on opposite sides of a seal case;
positioning a ring of the rotor between stop surfaces of the slinger;
engaging a snap-fit connection of the rotor and the slinger that locks the ring between the stop surfaces and permits the rotor and slinger to rotate relative to the seal case; and
wherein positioning the ring of the rotor between the stop surfaces of the slinger includes positioning the ring of the rotor between barbs and stops of the slinger, the barbs and stops including the stop surfaces.

37. The method of claim 36 wherein engaging the snap-fit connection includes engaging the barbs of the slinger with a rim of the rotor.

\* \* \* \* \*